United States Patent [19]
Bell

[11] Patent Number: 6,104,193
[45] Date of Patent: Aug. 15, 2000

[54] SYSTEM AND METHOD FOR DETECTING LOW METAL CONTENT BURIED MINES

[75] Inventor: Thomas H. Bell, Adamstown, Md.

[73] Assignee: AETC Inc., San Diego, Calif.

[21] Appl. No.: 09/153,463

[22] Filed: Sep. 15, 1998

[51] Int. Cl.$^7$ .............................. G01V 3/11; G01V 3/165
[52] U.S. Cl. .......................................... 324/329; 324/335
[58] Field of Search .................................. 324/326, 327, 324/329, 228, 232, 233, 236, 239, 335

[56] References Cited

U.S. PATENT DOCUMENTS

| | | | |
|---|---|---|---|
| 3,950,695 | 4/1976 | Barringer | 324/3 |
| 4,004,212 | 1/1977 | Wortman | 324/3 |
| 4,486,713 | 12/1984 | Gifford | 324/329 |
| 4,506,225 | 3/1985 | Loveless et al. | 324/334 |
| 4,942,360 | 7/1990 | Candy | 324/329 |
| 4,990,852 | 2/1991 | Kirkland | 324/326 |
| 5,307,272 | 4/1994 | Butler et al. | 364/424.02 |
| 5,525,907 | 6/1996 | Frazier | 324/334 |
| 5,596,277 | 1/1997 | Rowan | 324/329 |
| 5,963,035 | 10/1999 | Won | 324/329 |

*Primary Examiner*—Christine K. Oda
*Assistant Examiner*—Henry S. Andersen
*Attorney, Agent, or Firm*—John L. Rogitz

[57] ABSTRACT

A method and apparatus for detecting mostly-plastic mines having steel firing pins and copper igniter cups. A frequency spectrum is transmitted, and response signals from the metal components induced by resultant eddy currents are detected. The firing pin generates a response characterized by a first frequency that is in phase with the transmitted frequency, whereas the igniter cup generates a response characterized by a second frequency that is in quadrature with the transmitted frequency. Accordingly, the detected response can be compared to prestored response templates to determine what type of mine, if any, has been detected, with the use of two response frequencies and phase relationships enabling the discrimination of buried plastic mines from surrounding metal particles in the earth.

17 Claims, 4 Drawing Sheets

| Mine Type (62) | Center Freq. (pin) (64) | φ Relationship (66) | Freq. (cup) (68) | φ (70) |
|---|---|---|---|---|
| M14 | $f_1$ | in phase | $f_2$ | quad. |
| XX | $f_3$ | in phase | $f_4$ | quad. |
| . | . | . | . | . |
| . | . | . | . | . |
| . | . | . | . | . |

SYSTEM AND METHOD FOR DETECTING LOW METAL CONTENT BURIED MINES

FIELD OF THE INVENTION

The present invention relates generally to mine detection, and more particularly to systems and methods for detecting and classifying buried mines having low metal content.

BACKGROUND

Buried mines pose a hazard not only to military personnel in time of war, but also to non-combatants during time of peace. Indeed, many children each year are injured or killed by mines that are the lingering reminders of conflicts that have long since been resolved.

Thus mines, frequently buried by the thousands, remain threats to humans for prolonged periods, unless and until they are removed or otherwise neutralized. Accordingly, it is important to detect mines during and after armed conflict for subsequent neutralization of the mines.

It happens that many mines, particularly newer mines, are made mostly of plastic. This complicates the detection process, which is typically based on metal detection principles. It happens that even plastic mines incorporate small metal components such as steel firing pins and copper igniter cups, but discriminating such small components from other small metal objects buried in the vicinity of the mine is difficult.

With this in mind, it is perhaps not surprising that previous mine detection systems do not detect and classify plastic mines as readily as might be hoped. For example, U.S. Pat. No. 5,596,277 discloses a system that displays return signals as a function of phase to discriminate "good" targets from "bad", but the '277 patent teaches that a "good" target optimally will have a single phase angle range. Consequently, the '277 invention will only discriminate one type of metal from another, but not one type of metal in a mine from the same type of metal lying in the ground near the mine. Likewise, other mine detection systems of which the present patentee is aware cannot adequately discriminate small metal components of mostly-plastic mines from surrounding metal objects.

The present invention, however, fortuitously recognizes that it is possible to find and classify plastic mines. As recognized herein, plastic mines typically have two or more components that are made of dissimilar metals, with the size and composition of the metal components varying from mine to mine. The present invention further recognizes that the combination of the responses from the metal components of a plastic mine can be used to classify the responses as being unique to a particular type of mine. It is the object of the present invention to address one or more of the above-noted problems in an effective and cost-efficient way.

SUMMARY OF THE INVENTION

A method is disclosed for detecting land mines, and more particularly for detecting buried plastic mines that have at least first and second metal components. The method includes generating electromagnetic signals characterized by at least first and second transmitted frequencies. The first transmitted frequency is established based at least in part on characteristics of the first metal component, and the second transmitted frequency is established based at least in part on characteristics of the second metal component.

In accordance with electromagnetic principles, the electromagnetic signals induce response signals in metal objects. The response signals are detected, and based on the combination of at least two response signals, the method determines whether the metal objects are mine components.

In a preferred embodiment, the transmitted frequencies are inversely proportional to the conductivities of the respective metal components multiplied by one or more dimensions of the respective metal components. Additionally, the determining step can be undertaken by processing the response signals with at least first and second filters, with the first filter passing only signals that are in phase with the first transmitted frequency and the second filter passing only signals that are not in phase with the second transmitted frequency. More preferably, the second filter passes only signals that are in quadrature with the second transmitted frequency.

As intended by the present invention, the filters output respective filtered signals, and the method includes comparing the filtered signals to one or more templates to determine whether at least two response signals are from a mine. In one embodiment, the comparing step is executed by a computer.

In another aspect, a method for correlating at least two response signals induced in metal objects to a mine classification, based on a response frequency and phase of the response signals, includes generating a set of one or more response templates. Each template includes information representative of at least one expected frequency at one or more expected phase relationships. A transmitted spectrum is generated that includes at least first and second transmitted frequencies which induce response frequencies in metal objects. These response frequencies from the metal objects are detected, and then it is determined whether one or more response frequencies substantially match at least one of the prestored response templates to determine whether the metal objects are components of a mine.

In still another aspect, a mine detection system includes a signal transmitter for generating at least first and second transmitted frequencies characterized by at least one transmitted phase. A receiver detects response frequencies generated by eddy currents induced in metal objects by the transmitted frequencies. The response frequencies are characterized by respective response phases. Means are provided for correlating at least two response frequencies to at least one buried mine, when the respective response phases bear predetermined relationships to the transmitted phase.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
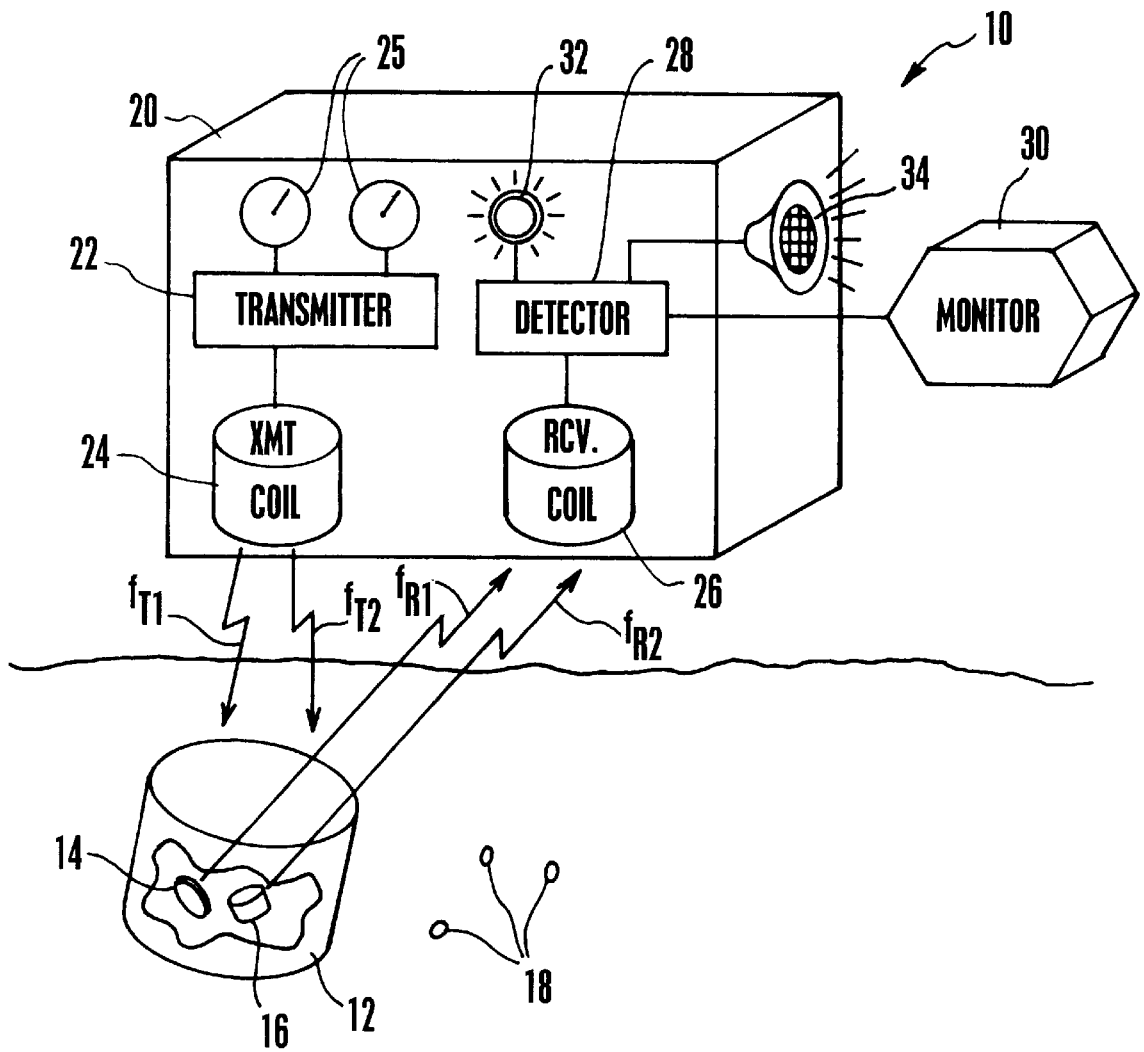
FIG. 1 is a schematic diagram of the present mine detection system.

Referring initially to FIG. 1, a system is shown, generally designated 10, for detecting mines, and in particular for detecting buried, mostly plastic land mines, such as a type Mark-14 land mine 12 having, as its principal metal components, a steel firing pin 14 and a copper igniter cup 16. The challenge met by the present invention is to detect and classify the mine 12 by detecting the metal components 14, 16 of the mine 12 and discriminating these components from other buried metal particles 18 that might be nearby the mine 12.

In one preferred embodiment, the system 10 includes a detector housing 20 that holds transmitting circuitry 22 for causing a primary (i.e., transmitter) coil 24 to transmit electromagnetic signals. As disclosed in detail below, the primary coil 24 transmits at least a frequency band, and more particularly the primary coil 24 transmits at least first and second frequencies or frequency bands $f_{T1}$, $f_{T2}$, each of which frequencies $f_{T1}$, $f_{T2}$ induces eddy currents in buried metal objects, such as the metal components 14, 16 of the mine 12. The frequencies or frequency bands can be established by appropriately manipulating one or more frequency controls 25 that are mounted on the housing and that are electrically connected to the transmitting circuitry 22.

As disclosed in greater detail below, the first transmitted frequency or frequency band is established based on the firing pins of the mines suspected of being buried, and the second transmitted frequency or frequency band is established based on the igniter cups of the mines suspected of being buried. It is to be understood that while for disclosure purposes the present discussion recites two transmitted frequencies or frequency bands, as intimated above only a single frequency band encompassing both desired frequencies $f_{T1}$, $f_{T2}$ need actually be transmitted. In a preferred embodiment, the frequency band is from about 200 Hz to 30 kHz.

In turn, the eddy currents produce response frequencies $f_{R1}$, $f_{R2}$ in the metal components 14, 16, respectively, which are detected by a secondary (receiver) coil 26 in the housing 20. The signal from the secondary coil 26 is sent to detector circuitry 28, and an output signal of the detector circuitry 28 can be presented on a crt or flat panel display monitor 30. Or, the detector circuitry output signal can activate a warning lamp 32 or audible alarm 34 on the housing 20, when the circuitry 28 determines that a mine has been detected in accordance with disclosure below.

It is to be further understood that while the coils 24, 26 are shown housed in a common housing 20, the coils 24, 26 can be housed separately from each other. Moreover, if desired a null coil (not shown) can be provided in accordance with principles known in the art.

In one preferred embodiment, the system 10 includes an induction sensor disclosed in U.S. Pat. No. 5,557,206, incorporated herein by reference, and marketed under the trade name GEM-3 by Geophex. Further details of the GEM-3 sensor are set forth in Won, et al.'s article entitled "Gem-3: A Monostatic Broadband Electromagnetic Induction Sensor", *Journal of Environmental and Engineering Geophysics*, Vol. 2, March 1977.

Figure 2:
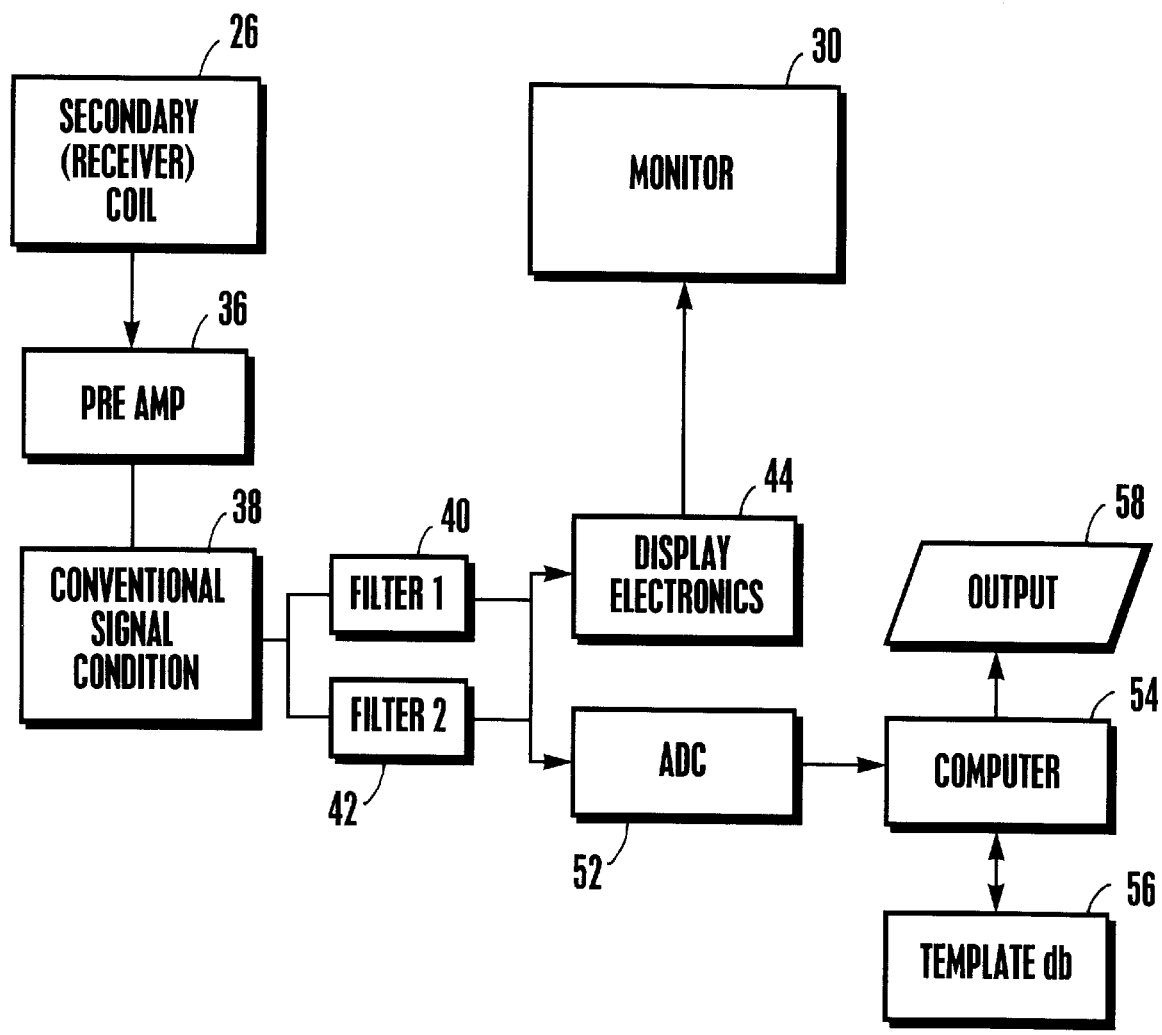
FIG. 2 is a block diagram of the electrical components of the detection circuitry.

FIG. 2 shows further details of the detector circuitry 28. Signals from the secondary coil 26 are sent to a preamplifier 36 and thence to conventional signal conditioning circuitry 38. As the skilled artisan will appreciate, among other things the signal conditioning circuitry 38 demodulates and amplifies the signal.

FIG. 2 additionally shows that if desired, the output signal from the signal conditioning circuitry 38 can be sent to first and second filters 40, 42. As recognized by the present invention, response signals from the steel firing pin 14 are in phase with the transmitted frequencies and positive, whereas response signals from the copper igniter cup 16 are out of phase, and more particularly are in quadrature with, the transmitted frequencies, and are negative. Accordingly, the first filter 40 is configured to pass only signals that are in phase with the first transmitted frequency, while the second filter 42 is configured for passing only signals that are not in phase with the second transmitted frequency, and more specifically that are in quadrature with the transmitted frequencies. If desired, the filters 40, 42 can apply a fast Fourier transform to the signals in accordance with signal processing principles known in the art to pass substantially only the response frequencies $f_{R1}$, $f_{R2}$. As shown in FIG. 2, the output signals of the filters 40, 42 are sent to conventional display electronics circuitry 44 that is associated with the monitor 30, for presenting a visual representation of the signals thereon.

Figures 3, 4:
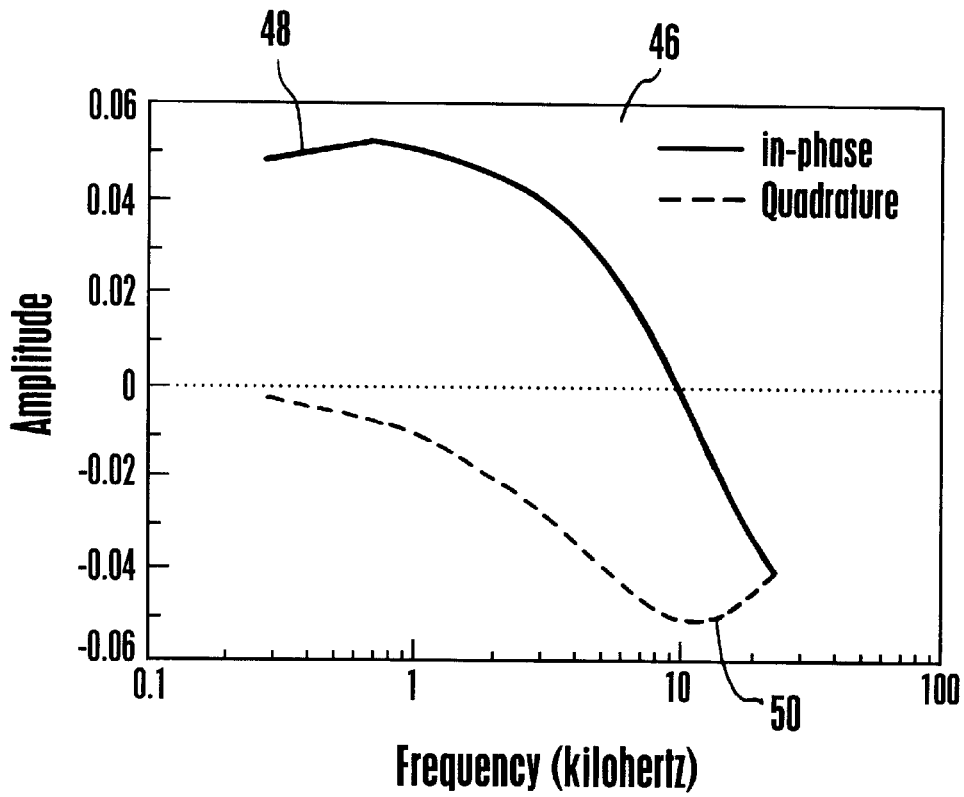
FIG. 3 is an exemplary correlation template.
FIG. 4 is an exemplary correlation template as might be embodied in computer software or firmware.

In accordance with the present invention, a set of expected mine response templates, such as the template 46 shown in FIG. 3, is generated. Each template includes information that is representative of at least one expected frequency at one or more expected phase relationships, and more particularly each template represents the expected return frequencies by phase relationship from two or more metal components of a respective plastic mine.

The template shown in FIG. 3 is for a Mark-14 mine. Accordingly, it includes a firing pin response curve 48 that is relatively flat from about 200 Hertz (Hz) to one kHz, with a slight peak occurring just below 1 kHz. The firing pin response curve 48, which represents signal returns that are positive and in-phase with the transmitted frequencies, diminishes from 1 kHz to higher frequencies, as shown. Moreover, the template 46 also includes an igniter cup response curve 50, representing signal returns that are negative and in quadrature with the transmitted frequencies. As shown, the igniter cup response curve 50 slopes down to a maximum negative value around 12 kHz.

As the signals from the filters 40, 42 are displayed on the monitor 30, a person can view the monitor 30 and compare its visual display with, e.g., the template 46 shown in FIG. 3.

When the signal displayed on the monitor 30 substantially matches the template 46, the user determines that the metal objects producing the signals are metal components from a Mark-14 mine. In other words, the person can determine whether the response frequencies $f_{R1}$, $f_{R2}$ substantially match at least one of the predetermined response templates to determine whether the metal objects are components of a mine. In this regard, the display on the monitor 30 can be considered a mine detection signal when the response frequencies match at least one predetermined template.

In any case, by viewing the monitor 30 and comparing the display thereon to the response templates, the viewer can correlate the response frequencies to at least one buried mine, when the phases of the respective response frequencies bear predetermined relationships to the phase of the transmitted frequency. On the other hand, if the display on the monitor 30 does not match a template, the user determines that what is being detected is not an object of interest.

The present invention additionally contemplates that the classification of mines can be undertaken automatically, by computer, based on the response signals. Referring back to FIG. 2, the signals from the filters 40, 42 can be sent to an analog to digital converter (ADC) 52 for digitization, and thence to a computer 54. The computer 54 accesses a template database 56 to compare the digitized response signals to entries in the database 56 and to generate a "mine"

signal when a match is found. The "mine" signal is sent to an output device 58, such as can be established by the warning lamp 32 or audible alarm 34 shown in FIG. 1, or by a monitor, printer, computer network, communications network, or other equivalent device.

FIG. 4 shows an example response template table 60 that can be electronically stored in the template database 58. As shown, the table 60 includes a first column 62, the entries in which represent mine types. Also, the table 60 can include four or more mine characteristic columns 64, 66, 68, 70. In the exemplary embodiment shown, each entry in a second column 64 represents an expected peak frequency in the response frequency from a firing pin of the associated mine in the first column 62. Also, each entry in a third column 66 represents the expected phase relationship of the frequency in the second column 64 vis-a-vis the transmitted frequency.

Moreover, each entry in a fourth column 68 represents an expected peak frequency in the response frequency from an igniter cup of the associated mine in the first column 62. Also, each entry in a fifth column 70 represents the expected phase relationship of the frequency in the fourth column 68 vis-a-vis the transmitted frequency. As stated above and indicated in FIG. 4, response signals (i.e., response frequencies) from steel firing pins are in phase with the transmitted frequencies that induced the responses, whereas response signals from copper igniter cups are in quadrature with the transmitted frequencies that induced the responses.

Preferably, the center frequencies shown in FIG. 4 (i.e., the peaks of the expected response frequencies), as well as the transmitted frequencies $f_{T1}$, $f_{T2}$ are established as follows:

$f=1/\{\pi\mu\sigma LD\}$, wherein $\mu=4 \pi \times 10^{-7}$ henry per meter, $\sigma$=conductivity of the metal component being sought (i.e., the pin or cup), L is the length of the metal component being sought in meters, and D is the diameter of the metal component being sought in meters.

Figure 5:
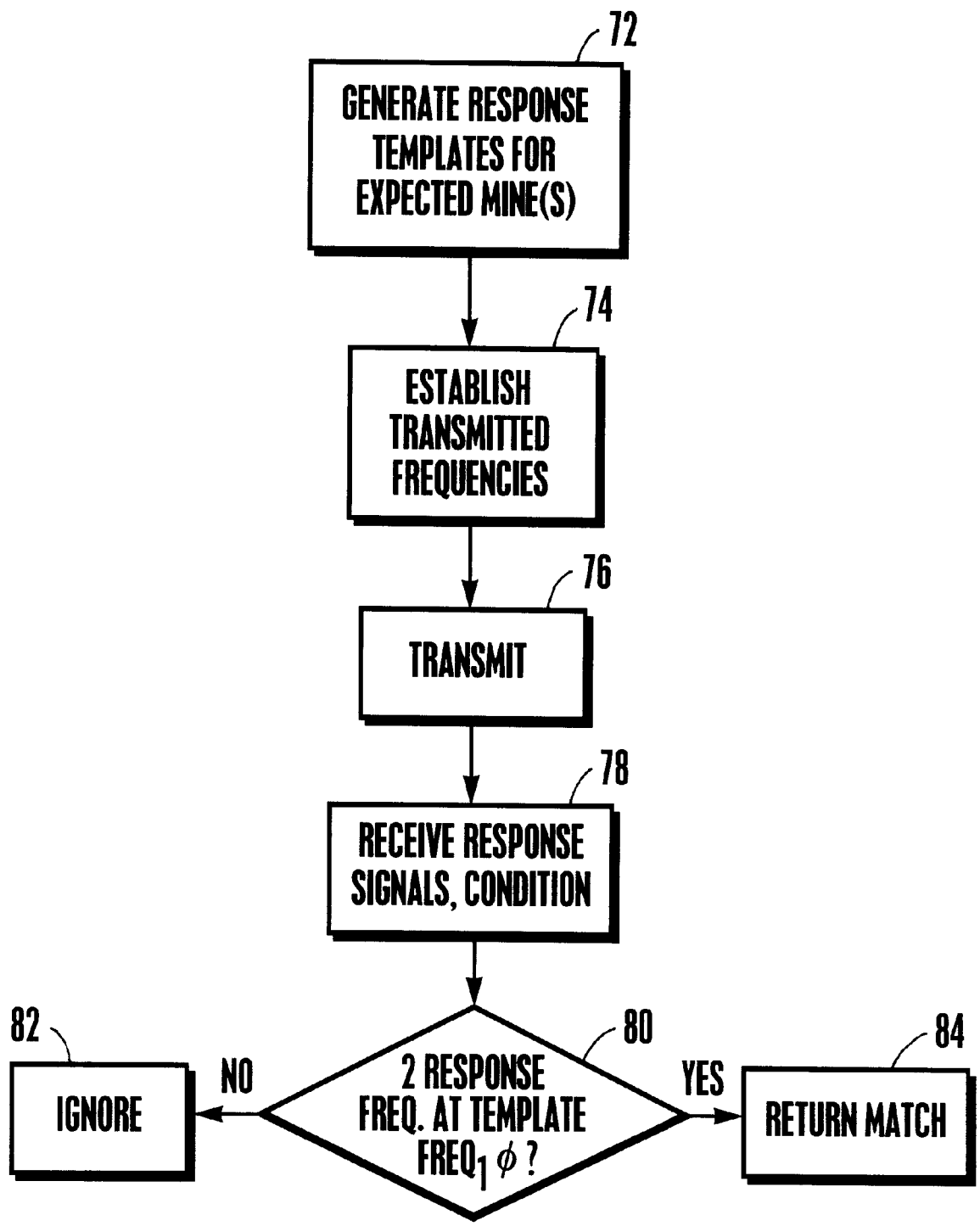
FIG. 5 is a flow chart of the present method for detecting mines.

The logic of the present invention, whether undertaken in whole or in part by the computer 54 shown in FIG. 2 or by a person, can be seen in reference to FIG. 5. It is to be understood that when the steps are undertaken by the computer 54, the steps are executed by logic components such as are embodied in logic circuits on, e.g., an application specification integrated circuit (ASIC) or in software contained in an appropriate electronic data storage, e.g., a hard disk drive and/or optical disk drive, that can be conventionally coupled to the computer 54. Or, the control components can be embodied in other logical components such as a computer diskette.

Thus, at least portions of FIG. 5 illustrate the present logical structure as might be embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. In an illustrative embodiment of the invention, the computer-executable instructions may be lines of compiled C++ compatible code.

Commencing at block 72 in FIG. 5, the response templates are generated for expected mines, as described above, and are electronically stored. Moving to block 74, the transmitted frequencies $f_{T1}$, $f_{T2}$ are established in accordance with the above equation by, e.g., appropriately manipulating the frequency controls 25. Proceeding to block 76, the frequencies are transmitted, and then at block 78 the response frequencies from metal objects in the ground nearby the secondary coil 26 are detected and processed as described. At decision diamond 80, the user or the computer 54 compares the pair of filtered responses to the prestored templates to determine whether the pair of responses substantially match a template. If not, the response signals are ignored at state 82; otherwise, a match is indicated at state 84, indicating that a mine of a particular type has been detected for facilitating subsequent neutralization of the mine. For mostly-plastic mines having three (or more) metal components, the principles above can be extended to generating and comparing templates that are based on three (or more) expected responses.

While the particular SYSTEM AND METHOD FOR DETECTING LOW METAL CONTENT BURIED MINES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

What is claimed is:

1. A method for detecting one or more land mines, at least one of the mines having at least first and second metal components, the method comprising:

generating at least first and second transmitted frequencies, the first transmitted frequency being established based at least in part on characteristics of the first metal component, the second transmitted frequency being established based at least in part on characteristics of the second metal component, the transmitted frequencies inducing response signals in metal objects;

detecting the response signals; and based on the combination of at least two response signals, determining whether the metal objects are mine components, wherein the transmitted frequencies are inversely proportional to the conductivities of the respective metal components multiplied by one or more dimensions of the respective metal components.

2. The method of claim 1, wherein the generating and detecting steps use primary and secondary coils, respectively.

3. A method for detecting one or more land mines, at least one of the mines having at least first and second metal components, the method comprising:

generating at least first and second transmitted frequencies, the first transmitted frequency being established based at least in part on characteristics of the first metal component, the second transmitted frequency being established based at least in part on characteristics of the second metal component, the transmitted frequencies inducing response signals in metal objects;

detecting the response signals; and based on the combination of at least two response signals, determining whether the metal objects are mine components, wherein the determining step is undertaken at least in part by processing the response signals with at least first and second filters, the first filter passing only signals that are in phase with the first transmitted frequency, the second filter passing only signals that are not in phase with the second transmitted frequency.

4. The method of claim 3, wherein the second filter passes only signals that are in quadrature with the second transmitted frequency.

5. The method of claim 4, wherein the filters output respective filtered signals, and the method includes comparing the filtered signals to one or more templates to determine whether at least two response signals are from a mine.

6. The method of claim 5, wherein the comparing step is executed by a computer.

7. A method for correlating at least two response signals induced in metal objects to a mine classification, based at least in part on the response frequencies and phases of the response signals, comprising:

generating a set of one or more response templates, each template including information representative of at least one expected frequency at one or more expected phase relationships;

generating a transmitted spectrum including at least first and second transmitted frequencies, the first and second transmitted frequencies inducing response frequencies in metal objects;

detecting response frequencies from the metal objects; and determining whether one or more response frequencies substantially matches at least one of the response templates to determine whether the metal objects are components of a mine, wherein the transmitted frequencies are inversely proportional to conductivities of the respective metal components multiplied by one or more dimensions of the respective metal components.

8. The method of claim 7, further comprising outputting a mine detection signal when at least two response frequencies and phases match at least one template.

9. The method of claim 7, wherein the first transmitted frequency is established based at least in part on characteristics of a first metal component of an expected mine, the second transmitted frequency being established based at least in part on characteristics of a second metal component of the expected mine.

10. The method of claim 7, wherein the generating transmitted signal step uses a primary coil and the detecting step uses a secondary coil.

11. The method of claim 7, wherein the determining step is executed by a computer.

12. A method for correlating at least two response signals induced in metal objects to a mine classification, based at least in part on the response frequencies and phases of the response signals, comprising:

generating a set of one or more response templates, each template including information representative of at least one expected frequency at one or more expected phase relationships;

generating a transmitted spectrum including at least first and second transmitted frequencies, the first and second transmitted frequencies inducing response frequencies in metal objects;

detecting response frequencies from the metal objects; and determining whether one or more response frequencies substantially matches at least one of the response templates to determine whether the metal objects are components of a mine, wherein the determining step is undertaken at least in part by processing the response frequencies with at least first and second filters, the first filter passing only signals that are in phase with the first transmitted signal, the second filter passing only signals that are not in phase with the second transmitted signal.

13. The method of claim 12, wherein the second filter passes only signals that are in quadrature with the second transmitted signal.

14. A mine detection system, comprising:

a signal transmitter for generating at least first and second transmitted frequencies characterized by at least one transmitted phase;

a receiver for detecting response frequencies generated by eddy currents induced in metal objects by the transmitted frequencies, the response frequencies being characterized by respective response phases;

means for correlating at least two response frequencies to at least one buried mine, when the respective response phases bear predetermined relationships to the transmitted phase; and at least first and second filters, the first filter passing only signals that are in phase with the first transmitted frequency, the second filter passing only signals that are in quadrature with the second transmitted frequency.

15. The system of claim 14, wherein the means for correlating includes a visual display.

16. The system of claim 14, wherein the means for correlating includes one or more computers.

17. A mine detection system, comprising:

a signal transmitter for generating at least first and second transmitted frequencies characterized by at least one transmitted phase;

a receiver for detecting response frequencies generated by eddy currents induced in metal objects by the transmitted frequencies, the response frequencies being characterized by respective response phases; and means for correlating at least two response frequencies to at least one buried mine, when the respective response phases bear predetermined relationships to the transmitted phase, wherein the transmitted frequencies are inversely proportional to conductivities of respective metal mine components multiplied by one or more dimensions of the respective metal components.

* * * * *